Jan. 12, 1932.                J. H. CARTER                 1,841,277
                       REFRIGERATED DISPLAY CABINET
                  Filed Dec. 31, 1929       2 Sheets-Sheet 1

INVENTOR
John Hayes Carter
BY A. Yates Dowell
ATTORNEY

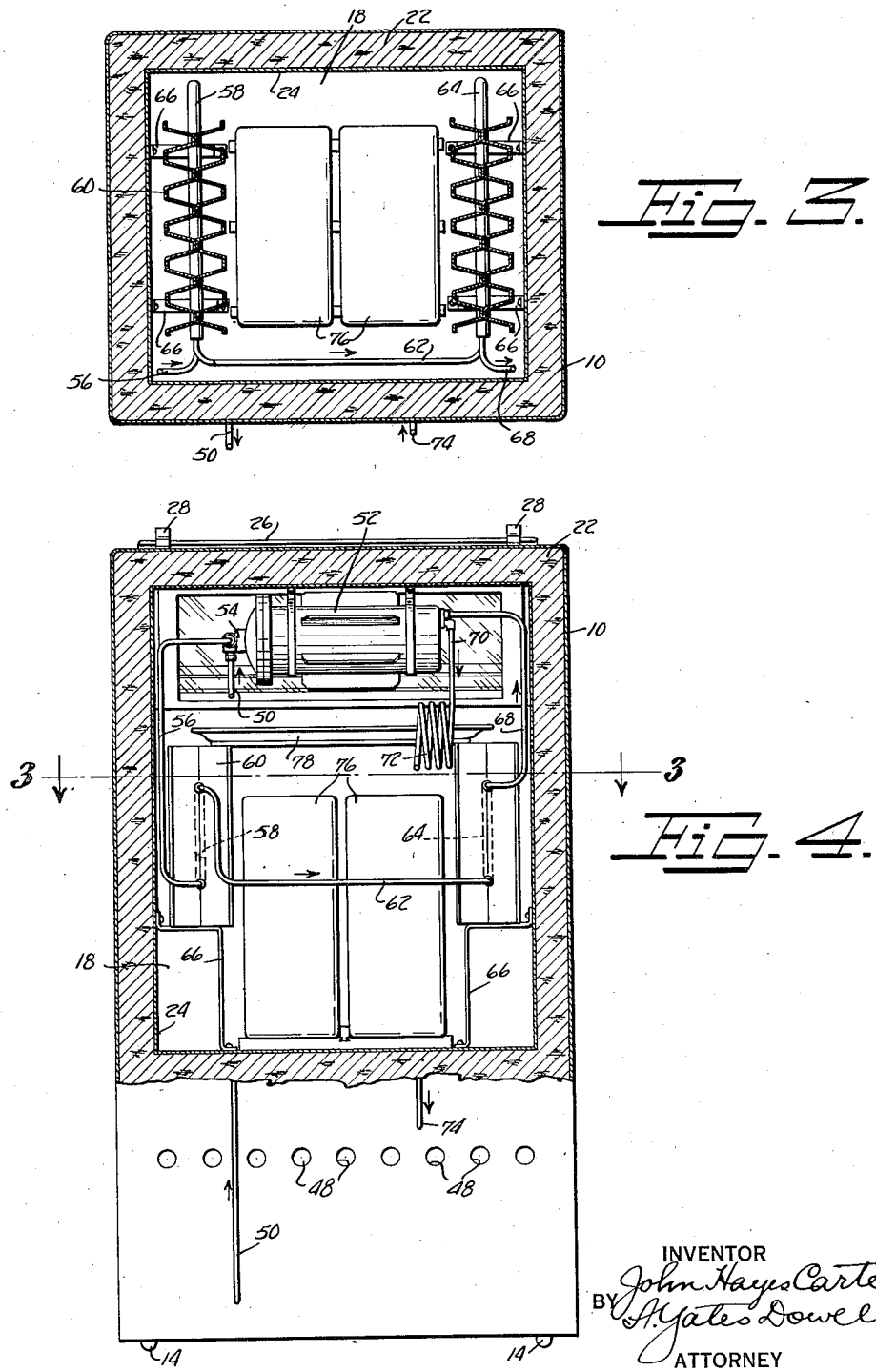

Patented Jan. 12, 1932

1,841,277

UNITED STATES PATENT OFFICE

JOHN HAYES CARTER, OF HARRISON, NEW YORK, ASSIGNOR TO SERVEL, INC., OF NEW YORK, N. Y., A CORPORATION OF DELAWARE

REFRIGERATED DISPLAY CABINET

Application filed December 31, 1929. Serial No. 417,722.

My invention relates to the art of refrigeration and more specifically to that phase of the art concerning food storage in display cabinets.

One of the particular purposes of my invention is to provide a cabinet of this type wherein certain comestibles, such as fish, which require to be maintained in a frozen condition, may be both stored and displayed. In the fish industry it is customary for the "cuts" of fish to be packed in cartons and shipped in refrigerated cars or trucks from the cold storage warehouses to the retailers. It is essential that the fish remain at all times solidly frozen until delivered to the customer. It is also of tremendous sales value for the retailer to keep on display a portion of the fish held in stock. A cabinet built in accordance with my invention provides for storage of cartons containing fish as well as for storage and display of fish removed from the cartons and maintains both in the necessary frozen condition.

Another object of my invention is to provide a cabinet embodying the aforementioned advantages in a neat, well arranged and self-contained structure which will in itself add greatly to the appearance of the store or market in which it is used.

Further objects and advantages will appear from the following description which is illustrated by the accompanying drawings, on which Fig. 1 is a top view of a storage and display cabinet constructed in accordance with a preferred form of my invention;

Fig. 3 is a section taken on the line 3—3 of Fig. 4; and

Fig. 4 is a back elevational view, partially in cross-section, of the cabinet shown in Figs. 1, 2 and 3.

Figure 1:
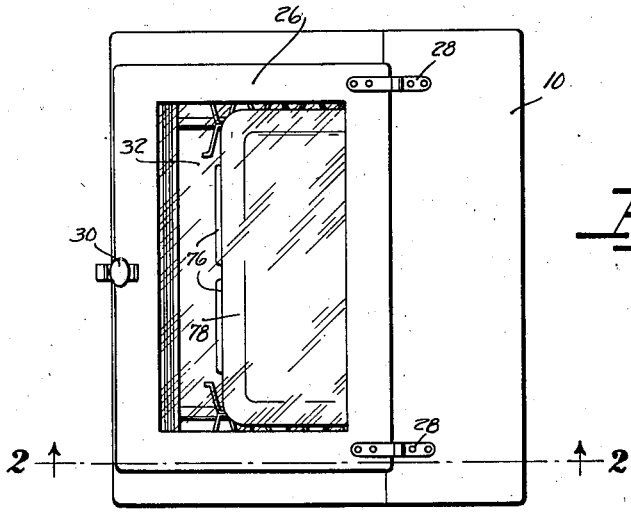
Figure 2:
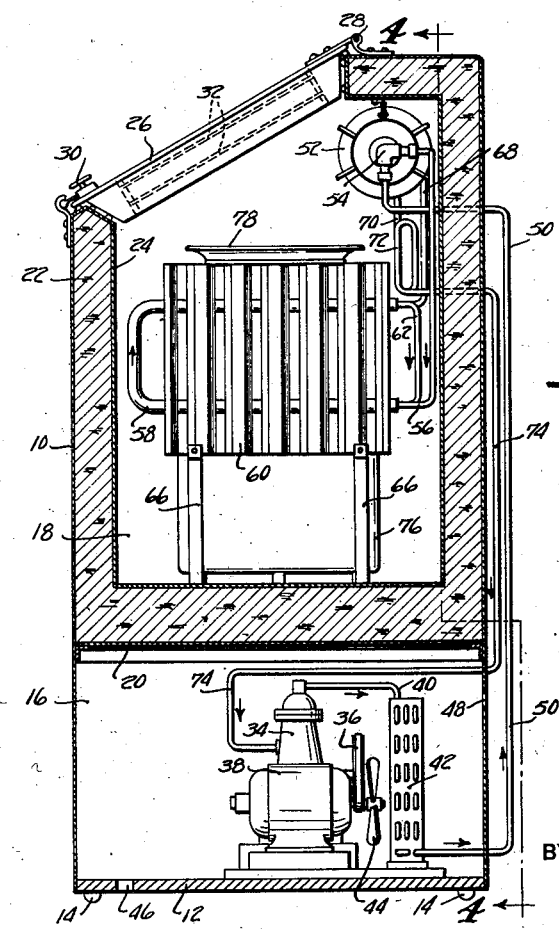
Fig. 2 is a section taken on the line 2—2 of Fig. 1.

Referring to the drawings, reference character 10 indicates sheet metal, suitably finished so as to present a good appearance and resist corrosion, which constitutes the exterior of the cabinet. This sheet metal is secured at the bottom to a base plate 12 which may be slightly elevated from the floor by short legs or casters 14.

The space within the cabinet is divided into a machine compartment 16 and a refrigerated food storage and display compartment 18 by a horizontal partition 20. Compartment 18 is lined with a good heat-insulating material 22, such as cork board, and is lined with a sheet metal liner 24. Liner 24 is preferably coated with glazed porcelain so as to present a sanitary surface for the interior of the food compartment. Admission to compartment 18 is had by means of a door 26 which is hinged at 28 and provided with a suitable latch 30.

The door itself comprises a frame in which are set preferably two or three panes of plate glass 32 spaced some distance apart. Several panes are used so as to obtain the heat-insulating qualities of the dead air spaces between them. When closed, door 26 is in an inclined position, which has been found to allow the best possible view of the contents of the interior of the cabinet to a person standing before it. Other advantages of having the door in this position, rather than in a vertical position, are first, that there is a minimum leakage of heat, both when the door is open or closed, as it is in the warmest part of the cabinet and the cold air tends to descend and thus does not rush out when the door is opened, and second, the tendency for moisture to condense on the glass and obstruct the view therethrough is a minimum for the same reasons.

Mounted on base 12 within machine compartment 16 is a compressor 34 driven through the medium of a belt 36 by an electric motor 38. A conduit 40 connects the outlet of compressor 34 with a condenser 42 around which air for cooling the same is circulated by means of a fan 44 mounted on the shaft of motor 38. This air is drawn into compartment 16 through a series of apertures 46 in base 12 and, after cooling the motor, compressor and condenser, is expelled through another series of apertures 48 in the back wall of the compartment. A conduit 50 communicates with the bottom of condenser 42, passes through the back of compartment 16 and thence upwardly along the back of the cabinet and into the upper part of compartment 18.

Supported within the rear upper part of compartment 18 is a float chamber designated generally by reference character 52. This chamber is preferably similar to that disclosed in application Serial No. 152,339 of Frank D. Peltier and Clyde E. Ploeger, now matured into Patent No. 1,788,343. Conduit 50 communicates with the inlet of valve chamber 54 while a conduit 56 connects the outlet of the valve chamber with an evaporator coil 58. Coil 58 is preferably provided with a series of heat conducting flanges 60. The outlet of coil 58 is connected by means of a conduit 62 with the inlet of a similar evaporator coil 64. Coils 58 and 64 are placed at either end of compartment 18 and are supported therein by brackets 66.

A conduit 68 connects the outlet of coil 64 with float chamber 52. A conduit 70 communicates with the outlet of the float chamber and with a small secondary evaporator coil 72 placed below valve 52 in compartment 18. A conduit 74 connects coil 72 with the inlet of compressor 34.

Reference character 76 indicates two cartons of fish which are placed in the storage space of compartment 18 between coils 58 and 64. A display tray 78 is adapted to be placed on the flanges of coils 58 and 64 and practically conceals cartons 76, itself being in full view through the glass in door 26.

The operation of the apparatus is substantially as follows: A suitable refrigerant, preferably methyl chloride, is compressed in a gaseous state by compressor 34 and passes through conduit 40 to condenser 42 where it is cooled by air and liquefied. The liquid refrigerant under a comparatively high pressure passes from the condenser through conduit 50 to valve chamber 54 where it passes through a pressure reduction valve and into conduit 56 to evaporator coil 58. Here some of the refrigerant evaporates and absorbs heat from the contents of compartment 18. The vapor thus formed and the unevaporated portion of the refrigerant passes through conduit 62 to coil 64 where much of the remainder of the refrigerant evaporates. The unevaporated refrigerant is carried along with the vapor through conduit 68 to the float chamber 52. This float chamber is also an evaporation member since the liquid evaporates therein and absorbs heat from the surrounding air. If liquid is supplied to the float chamber faster than it can evaporate it collects therein and by means of a float closes the valve in valve chamber 54 and thus reduces the amount of refrigerant supplied to the expansion coils. Thus an automatic control of the pressure reduction valve is secured.

The vaporous refrigerant passes from the float chamber through conduit 70 to coil 72, where any entrained liquid refrigerant is evaporated, and thence through conduit 74 to the inlet of compressor 34 where it is compressed and passes through the above cycle once more.

It will be seen that cartons 76 are in the coldest part of compartment 18 and will be adequately cooled by coils 58 and 64. The fish or other food will be cooled in two ways, first by heat conducted through the tray from the food to the flanges of coils 58 and 64 on which the tray rests and second by the descending current of cold air which has been cooled by contact with float valve 52 in which, as pointed out, there is liquid refrigerant which evaporates. Thus, assurance is had that the food on display will be maintained at a sufficiently low temperature.

The temperature necessary to maintain fish in the desired frozen condition is usually about 20° F. This temperature may be advantageously maintained within close limits by placing a thermostat within compartment 18 and arranged to operate a suitable switch placed in the circuit of motor 38. Thus, when the desired low temperature is obtained the thermostat functions to open the switch and stop the motor. The refrigerating apparatus remains idle until the temperature within compartment 18 has risen a few degrees, whereupon the thermostat closes the switch and starts the motor.

While I have described a more or less specific embodiment of my invention, it is to be understood that modifications thereof fall within its scope. It is not limited to use in connection with the particular type of refrigerating apparatus described but any apparatus capable of maintaining the desired temperature and having evaporation members suitably arranged may be employed. The scope of my invention is set out in the appended claims and is not to be otherwise limited than by these claims viewed in the light of the prior art.

What I claim is:

1. In a display refrigerator, a chamber to be cooled, said chamber having an inclined opening in the upper part thereof, a transparent closure member for said opening, evaporator coils disposed below said opening, said chamber having storage space around and below said coils, heat radiating fins on said evaporator coils, a display receptacle adapted to be supported on said fins, an evaporator in the upper part of said chamber, an apparatus compartment below said chamber, and a compressor-condenser unit in said compartment for supplying liquid refrigerant to said evaporator elements.

2. In a display refrigerator, a chamber to be cooled, evaporator coils disposed intermediate the top and bottom of said chamber allowing storage space around and below said coils, heat radiating fins on said coils, a display receptacle adapted to be supported on said fins, an evaporator in the upper part of said chamber, and means for supplying liquid refrigerant to said evaporator elements.

3. In a display refrigerator, a chamber to be cooled, evaporator coils disposed at the ends of said chamber intermediate the top and bottom thereof allowing storage space between and below said coils, heat radiating fins on said coils, a display receptacle adapted to be supported on said fins, and an evaporator in the upper part of said chamber.

In testimony whereof I have hereunto affixed my signature.

JOHN HAYES CARTER.